(12) United States Patent
Suzuki et al.

(10) Patent No.: US 8,449,643 B2
(45) Date of Patent: May 28, 2013

(54) EXHAUST GAS CLEANER

(75) Inventors: Norihiko Suzuki, Saitama (JP); Takeshi Mori, Saitama (JP); Hiroki Hosoe, Saitama (JP); Keita Ishizaki, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 438 days.

(21) Appl. No.: 12/741,566

(22) PCT Filed: Nov. 7, 2008

(86) PCT No.: PCT/JP2008/070280
§ 371 (c)(1),
(2), (4) Date: May 5, 2010

(87) PCT Pub. No.: WO2009/060933
PCT Pub. Date: May 14, 2009

(65) Prior Publication Data
US 2010/0242458 A1    Sep. 30, 2010

(30) Foreign Application Priority Data
Nov. 7, 2007    (JP) ................................. 2007-289930

(51) Int. Cl.
*B01D 39/06* (2006.01)
*B01D 39/14* (2006.01)
*F01N 3/00* (2006.01)

(52) U.S. Cl.
USPC .......................... 55/523; 55/DIG. 30; 422/177

(58) Field of Classification Search
USPC  55/522–524; 422/169–172, 177–182; 60/297
See application file for complete search history.

(56) References Cited

U.S. PATENT DOCUMENTS

| | | | | |
|---|---|---|---|---|
| 5,114,581 A | * | 5/1992 | Goldsmith et al. | 210/650 |
| 5,198,007 A | * | 3/1993 | Moyer et al. | 55/523 |
| 5,221,484 A | * | 6/1993 | Goldsmith et al. | 210/650 |

(Continued)

FOREIGN PATENT DOCUMENTS

| | | |
|---|---|---|
| CN | 1714931 A | 1/2006 |
| EP | 1 378 289 A2 | 1/2004 |

(Continued)

OTHER PUBLICATIONS

Office Action issued to European Application No. EP08846365.8 mailed Jun. 1, 2012.

(Continued)

*Primary Examiner* — Duane Smith
*Assistant Examiner* — Amber Orlando
(74) *Attorney, Agent, or Firm* — Arent Fox LLP

(57) ABSTRACT

An exhaust gas cleaner which can attain an improvement in the efficiency of particulate filter regeneration and has excellent durability. The exhaust gas cleaner, which purifies an exhaust gas discharged from an internal combustion engine, comprises: a gas channel through which the exhaust gas flows; and a DPF (17) disposed in the gas channel and having many pores. The DPF (17) has an introduction surface (171) which comes into contact with the exhaust gas, the surface (171) having been almost wholly coated with a microporous material (18) having micropores with a smaller pore diameter than the pores. This microporous material (18) comprises a support made of an oxygen-storing/releasing oxide having one or more elements selected from the group consisting of alkaline earth metal elements, transition metal elements, Group-12 elements, and Group-13 elements and a silver-containing catalyst deposited on the support.

3 Claims, 10 Drawing Sheets

U.S. PATENT DOCUMENTS

| | | | |
|---|---|---|---|
| 5,773,103 A * | 6/1998 | Ciora et al. | 428/34.6 |
| 6,284,211 B1 * | 9/2001 | Miyadera et al. | 423/239.1 |
| 6,390,304 B1 * | 5/2002 | Wilson et al. | 210/491 |
| 6,649,563 B2 * | 11/2003 | Nakanishi et al. | 502/439 |
| 7,179,430 B1 * | 2/2007 | Stobbe et al. | 422/180 |
| 7,625,529 B2 * | 12/2009 | Ohno et al. | 422/180 |
| 7,722,829 B2 * | 5/2010 | Punke et al. | 422/180 |
| 7,951,338 B2 * | 5/2011 | Miyairi et al. | 422/177 |
| 8,003,190 B2 * | 8/2011 | Ohno et al. | 428/116 |
| 2004/0033175 A1 * | 2/2004 | Ohno et al. | 422/180 |
| 2004/0191133 A1 * | 9/2004 | Yamaguchi | 422/180 |
| 2005/0169818 A1 * | 8/2005 | Ohno et al. | 422/177 |
| 2005/0207946 A1 * | 9/2005 | Asano et al. | 422/177 |
| 2007/0224092 A1 * | 9/2007 | Miyairi et al. | 422/180 |

FOREIGN PATENT DOCUMENTS

| | | |
|---|---|---|
| EP | 1 576 998 A2 | 9/2005 |
| EP | 1 723 998 A1 | 11/2006 |
| EP | 1 820 562 A1 | 8/2007 |
| JP | 09-220423 A | 8/1997 |
| JP | 2001-073748 A | 3/2001 |
| JP | 2003-211001 A | 7/2003 |
| JP | 2004-232530 A | 8/2004 |
| JP | 2005-296935 | 10/2005 |
| JP | 2006-192347 A | 7/2006 |
| JP | 2007-313443 A | 12/2007 |
| WO | WO 93/12867 A1 | 7/1993 |
| WO | WO 99/47238 A1 | 9/1999 |
| WO | WO 2007/043442 A1 | 4/2007 |
| WO | WO 2007/116715 A1 | 10/2007 |
| WO | WO 2010/097634 A1 | 9/2010 |

OTHER PUBLICATIONS

Office Action issued to EP Application No. 08846365.8, Mailed Jun. 9, 2011.

Krishna, K. et al, "Potential Rare-Earth Modified $CeO_2$ Catalysts for Soot Oxidation", Topics in Catalysis, May 1, 2007, pp. 221-228, vol. 42-43, No. 1-4, Kluwer Academic Publishers-Plenum Publishers, NE, XP019509030, DOI: 10.1007/s11244-007-0182-2.

English translation and Office Action dated Dec. 5, 2012 in Chinese Patent Application No. 200880114620.0.

* cited by examiner

MICROPOROUS BODY

DPF

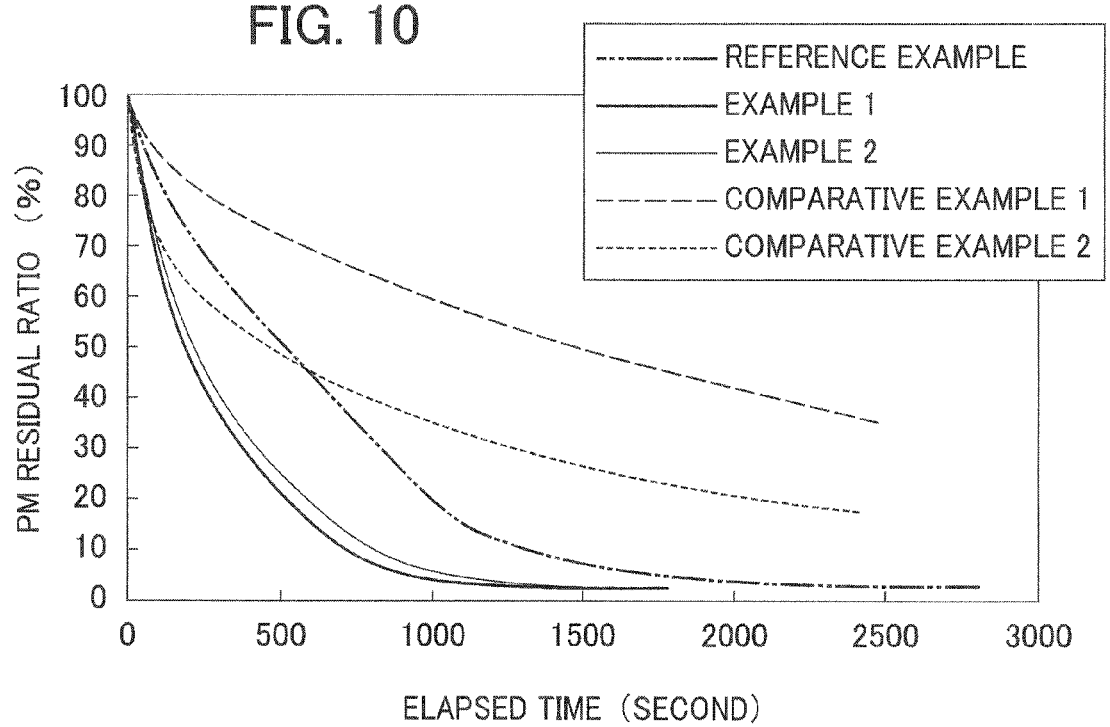

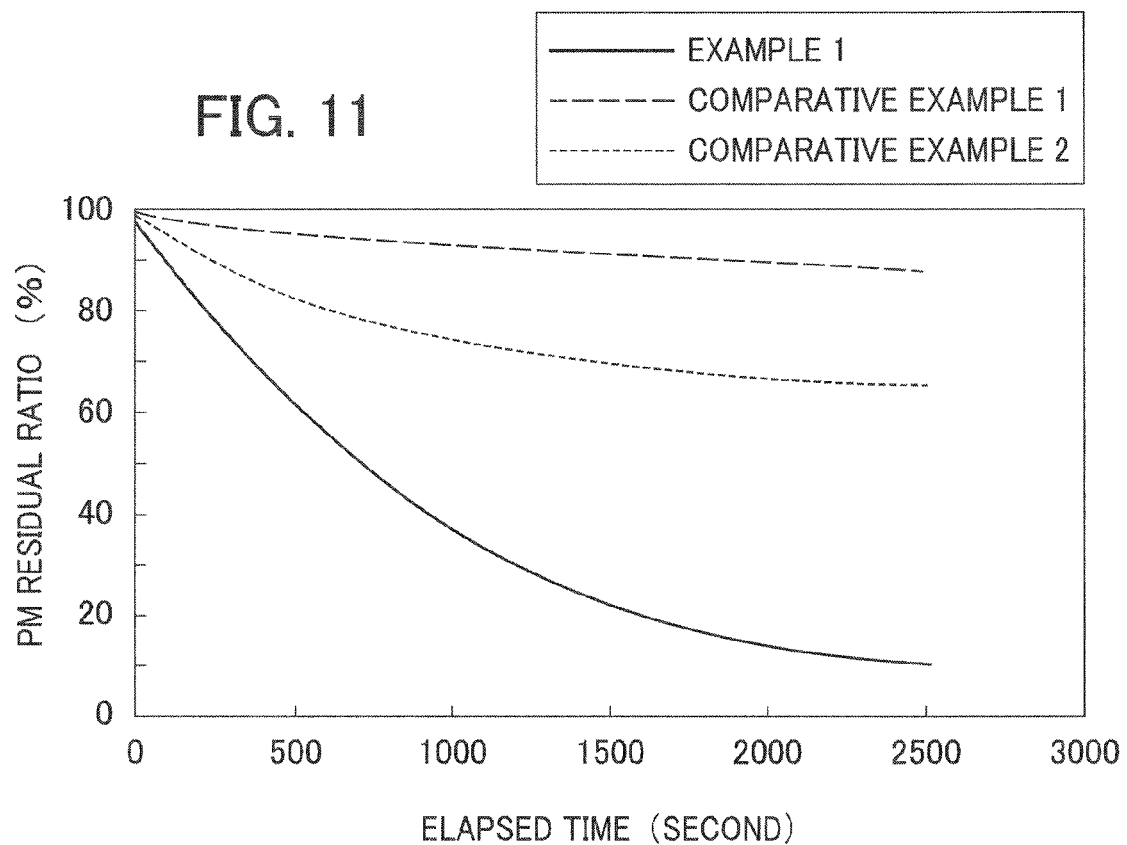

EXHAUST GAS CLEANER

CROSS-REFERENCE TO RELATED APPLICATION

This application is a National Stage entry of International Application No. PCT/JP2008/070280, filed Nov. 7, 2008, which claims priority to Japanese Application No. 2007-289930 filed Nov. 7, 2007, the entire specification claims and drawings of which are incorporated herewith by reference.

TECHNICAL FIELD

The present invention relates to an exhaust gas cleaner that purifies exhaust gas emitted from an internal combustion engine.

BACKGROUND ART

Conventionally, an exhaust gas cleaner including a particulate filter that collects particulates (hereinafter also referred to as PM), and the like has been provided in an exhaust system of a vehicle. Although PM contained in exhaust gas is collected in the particulate filter when the exhaust gas passes through a DPF, since PM deposits on the DPF in this process, thereby generating a pressure loss, fuel consumption deteriorates. Therefore, it is necessary to periodically or continuously remove PM from the DPF.

PM is derived mainly from fuel, and is composed of a soluble organic fraction (SOF), which is an easily combusted component, and soot, which is a difficult component to combust. Although the exhaust gas temperature is typically in the range of 200° C. to 450° C., the soluble organic fraction has a combustion initiation temperature of 200° C. to 550° C. and is efficiently removed; however, soot has a combustion initiation temperature of 550° C. to 700° C. and remains mostly not removed.

Therefore, fuel is periodically injected into the exhaust system and combusted, and the particulate filter are raised in temperature up to the combustion temperature of soot by the combustion heat generated at this time, thereby performing a forced regeneration process. However, in the regeneration process, it is necessary to maintain high temperature conditions of about 600° C. for 10 to 20 minutes in order to sufficiently restore the pressure loss level, and thus there is concern over fuel consumption deterioration and wear on the particulate filter. Therefore, there is a necessity to reduce the combustion initiation temperature of PM, and particularly of soot.

Techniques using a variety of catalysts that cause the combustion initiation temperature to decrease have been developed in response to such a demand. For example, an exhaust gas cleaner produced by coating a DPF in an aqueous slurry containing a catalyst material composed of silver, copper, oxides thereof, and ceria, drying, and calcining (dip-coating method) has been disclosed in Patent Document 1.

Patent Document 1: Japanese Unexamined Patent Application Publication No. 2001-73748

DISCLOSURE OF THE INVENTION

Problems to be Solved by the Invention

However, since for the exhaust gas cleaner disclosed in Patent Document 1, there is still a necessity to maintain a certain temperature condition to a high level (450° C. to 600° C.) for approximately 10 minutes, a deterioration in fuel consumption has not yet been avoided, and there is concern over a decline in catalytic function along with deterioration such as structural breakdown.

The present invention is made taking into account the above-mentioned actual conditions, and has an object of providing an exhaust gas cleaner that can improve regeneration efficiency of the particulate filter and excels in durability.

Means for Solving the Problems

The present inventors have found that the local flow of exhaust gas can be suppressed and a rapid decline in pressure loss during regeneration can be prevented by covering an inlet surface of a particulate filter with a microporous body, and that a silver-base catalyst excels in a decreasing function of the PM combustion initiation temperature and durability, thereby arriving at completing the present invention. More specifically, the present invention provides the matters described below.

According to a first aspect, in an exhaust gas cleaner that purifies exhaust gas emitted from an internal combustion engine, the exhaust gas cleaner includes:

a gas channel in which exhaust gas flows; and a particulate filter that is provided in the gas channel and in which a plurality of pores are formed, in which an inlet surface of the particulate filter, which the exhaust gas contacts, is covered over a substantial entirety thereof with a microporous body formed by micropores having a pore diameter smaller than the pores, and in which the microporous body includes a carrier composed of an oxide with an oxygen storage/release property containing at least one element selected from the group consisting of alkali earth metal elements, transition metal elements, periodic group 12 elements, and periodic group 13 elements, and a catalyst containing Ag that is supported on the carrier.

According to a second aspect, in the exhaust gas cleaner as described in the first aspect, the catalyst further contains at least one transition metal element other than Ag.

According to a third aspect, in the exhaust gas cleaner as described in the second aspect, the transition metal element is at least one selected from the group consisting of Ru, Pd, and Pt.

According to a fourth aspect, in the exhaust gas cleaner as described in any one of the first to third aspects, the oxide includes a composite oxide.

According to a fifth aspect, in the exhaust gas cleaner as described in the fourth aspect, the composite oxide is at least one type selected from the group consisting of fluorite, perovskite-type, spinel-type, rutile-type, delafossite-type, magnetoplumbite-type, and ilmenite-type.

According to a sixth aspect, in the exhaust gas cleaner as described in any one of the first to fifth aspects, at least 95% of the micropores have a value of pore diameter measured by mercury porosimetry of less than 7 μm.

According to a seventh aspect, in the exhaust gas cleaner as described in any one of the first to sixth aspects, the microporous body has a porosity that is higher than the particulate filter.

Effects of the Invention

According to the present invention, since substantially the entirety of the inlet surface has been covered by a microporous body in which micropores having a pore diameter smaller than the pores of the particulate filter are formed, a sudden decrease in pressure loss during regeneration is prevented.

Moreover, since a carrier composed of an oxygen storing/releasing oxide is used, a decrease in the PM combustion initiation temperature can be aided by the catalyst. In addition, due to an Ag-containing catalyst being supported on such a carrier, the fuel consumption can be dramatically improved by greatly decreasing the PM combustion initiation temperature. These temperature reducing and aiding functions do not easily decline greatly with time even under high temperature conditions such as the regeneration process. Consequently, it is possible to improve regeneration efficiency of the particulate filter and it is possible to improve durability of the cleaner.

BRIEF DESCRIPTION OF THE DRAWINGS

FIG. 10 is a view showing regeneration efficiency of the exhaust gas cleaner according to the Examples of the present invention; and FIG. 11 is a view showing regeneration efficiency of the exhaust gas cleaner according to the Examples of the present invention.

Figure 1:
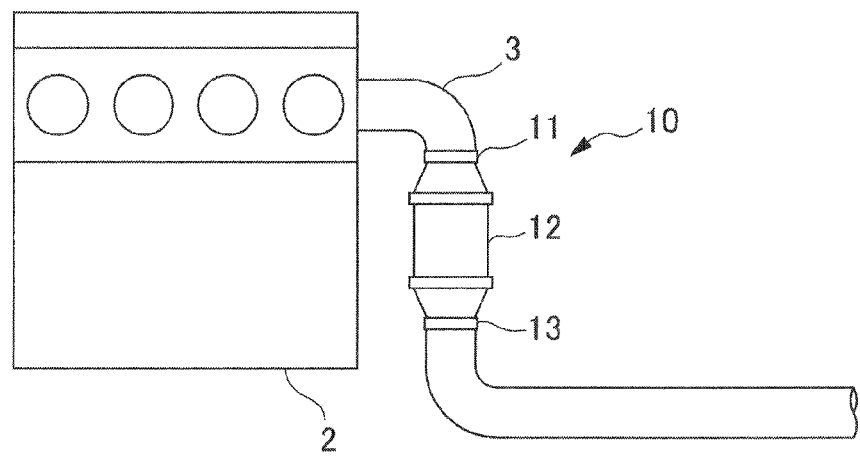
FIG. 1 is a view showing an installed state of the exhaust gas cleaner according to an embodiment of the present invention.

EXPLANATION OF REFERENCE NUMERALS 2 diesel engine (internal combustion engine)
3 exhaust pipe
10 exhaust gas cleaner
11 inlet
12 casing
13 outlet
14 gas channel
15a inlet flow path
15b outlet flow path
16 cell
17 DPF (particulate filter)
18 microporous body
161 barrier wall
171 inlet surface

PREFERRED MODE FOR CARRYING OUT THE INVENTION

An embodiment of the present invention is explained below while referring to the drawings; however, the present invention is not to be limited thereto.

Exhaust Gas Cleaner

Figure 2:
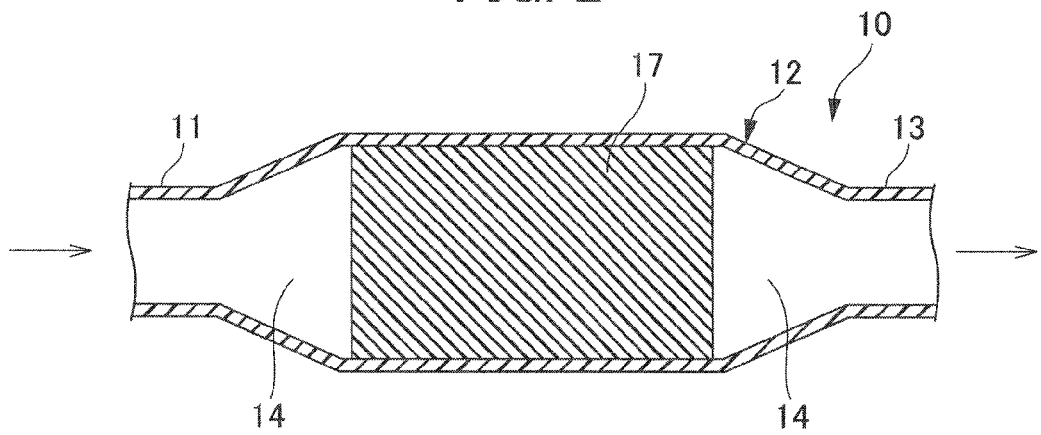
FIG. 2 is a schematic diagram of the exhaust gas cleaner according to the embodiment.

FIG. 1 is a view showing an installed state of an exhaust gas cleaner 10 according to an embodiment of the present invention. FIG. 2 is a schematic diagram of the exhaust gas cleaner 10.

As shown in FIG. 1, the exhaust gas cleaner 10 is provided midstream of the exhaust pipe 3 of the diesel engine 2, as the internal combustion engine. Although exhaust gas emitted from such a diesel engine 2 contains PM and the like, it is purified by a process in which it is introduced inside of the exhaust gas cleaner 10 from an inlet 11, and discharged downstream of the exhaust gas cleaner 10 from an outlet 13. The mechanism thereof is explained in detail below.

As shown in FIG. 2, the exhaust gas cleaner 10 has a hollow casing 12, and a gas channel 14 is formed inside of this casing 12. A DPF 17 is provided as a particulate filter in the gas channel 14, and exhaust gas introduced from the inlet 11 is discharged from the outlet 13 after having passing through the DPF 17.

Since many pores (not illustrated) are formed in the DPF 17, the DPF 17 has the ability to collect PM in exhaust gas. Although not particularly limited, the material of such a DPF 17 can be exemplified by cordierite, silicon carbide, mullite, alumina, aluminum titanate, and the like, for example.

Figure 3:
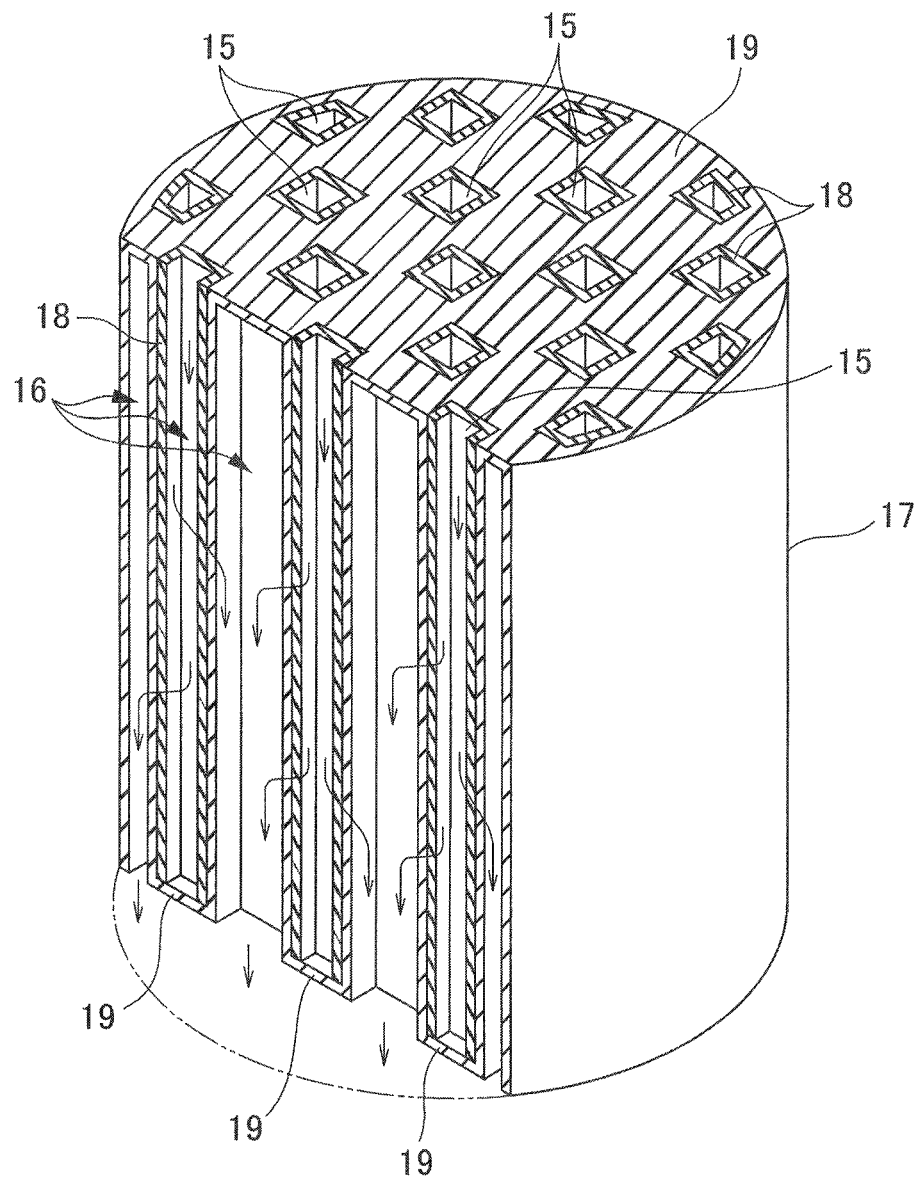
FIG. 3 is an overall perspective view of a particulate filter configuring the exhaust gas cleaner according to the embodiment.
Figure 4:
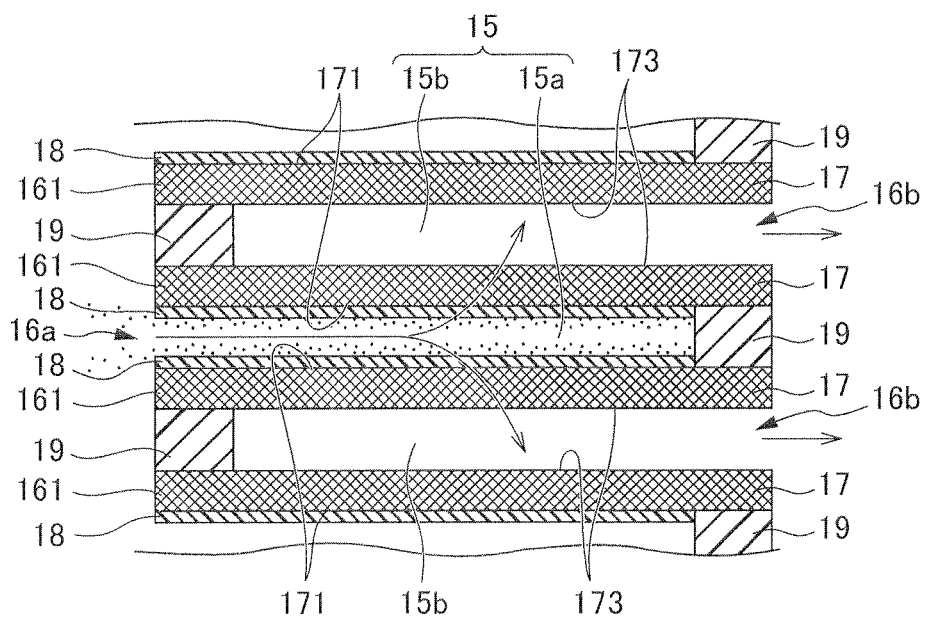
FIG. 4 is an enlarged cross-sectional view of a portion of FIG. 3.

FIG. 3 is an overall perspective view of the DPF 17, and FIG. 4 is an enlarged cross-sectional view of a portion of FIG. 3. As shown in FIG. 3, the DPF 17 has a honeycomb structure, and is provided with many cells 16 along a flow direction of gas. Each of the cells 16 is mutually partitioned by barrier walls 161, and end portions at an upstream side and at a downstream side in the flow direction of gas are alternately blocked by a sealant 19. As a result, the exhaust gas introduced from the inlet 11 flows in to the inlet flow path 15a of the cells 16a having an upstream-side end portion open, and contact the inlet surface 171 of the barrier walls 161. Substantially the entirety of this inlet surface 171 is covered with the microporous body 18. It should be noted that, although substantially the entirety may be made an appropriately setting so that it is possible to raise the PM removal performance up to a desired extent, it is typically at least 90% of the inlet surface.

Figure 5:
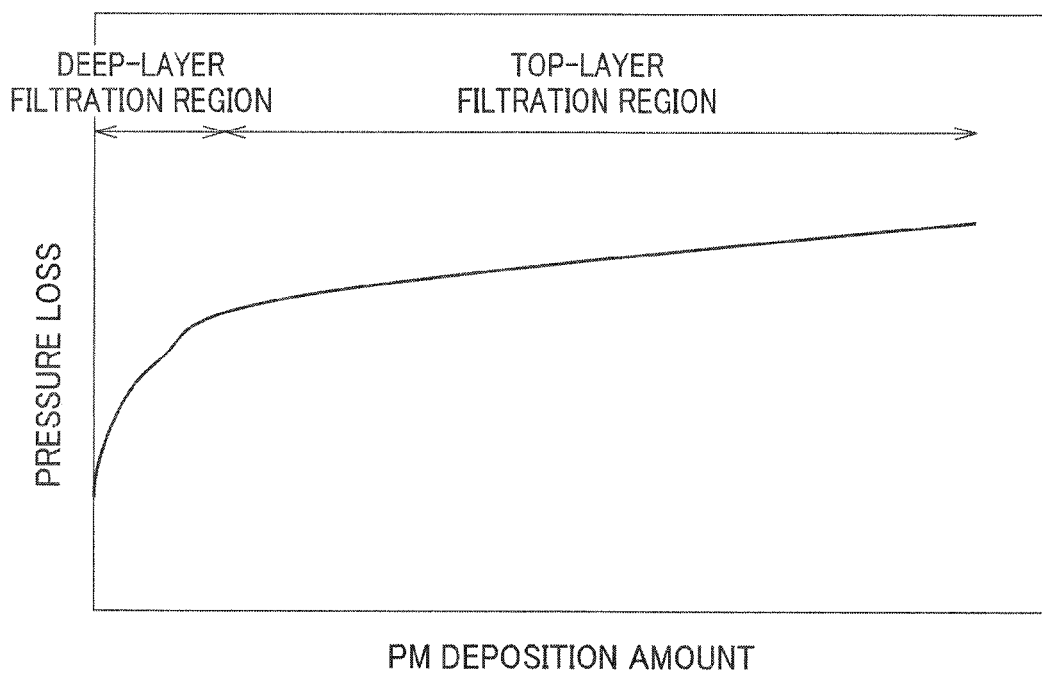
FIG. 5 is a graph showing a relationship between particulate deposition amount on the particulate filter and pressure loss.

Herein, a case is assumed in which the inlet surface 171 is not covered by the microporous body 18. FIG. 5 is a graph showing a relationship between PM deposition amount on the DPF and pressure loss. PM in the exhaust gas is preferentially captured inside the pores of the DPF (deep-layer filtration region), a result of which the pores are rapidly blocked, whereby the pressure loss suddenly rises. When the captured amount increases, PM before long starts to deposit on the surface of the DPF (top-layer filtration region), and forms a cake layer having microscopic pores. When this happens, PM in the exhaust gas deposits on the cake layer, and it becomes difficult to cause blocking in the pores of the DPF, whereby the rise in pressure loss slows down.

When such a DPF increases in temperature to be regenerated, PM captured in the vicinity of an attained portion having attained the combustion initiation temperature of PM starts to combust. Consequently, since the blocked state of pores in the attained portion is eliminated, the pressure loss at the attained portion rapidly decreases, and becomes very small compared to the pressure loss at other portions. When this happens, since exhaust gas preferentially passes in the vicinity of the attained portion, oxygen in the exhaust gas is used slowly to combust PM; however, since it becomes difficult for the exhaust gas to pass through a large portion of the DPF, combustion of PM in order for there to be an oxygen deficiency at other portions around the attained portion remains substandard. As a result, a long time, such as ten to several tens of minutes, comes to be needed until 90% of PM deposited is removed.

On the other hand, in the exhaust gas cleaner according to the present invention, the inlet surface 171 as described earlier is covered by the microporous body 18, and gas from which PM has been removed by passing sequentially through the microporous body 18 and the DPF 17 flows out to the outlet flow path 15b of the cell 16b, and before long is discharged to downstream of the exhaust gas cleaner 10 from the outlet 13 as purified gas.

In addition, micropores are formed in the microporous body 18, and these micropores have a pore diameter smaller than the pores. As a result, it becomes difficult for PM in the exhaust gas that has flowed into the inlet flow path 15a to penetrate the micropores, and results in the tendency to deposit on the surface of the microporous body 18 gaining strength. It should be noted that the measurement procedure and conditions for pore diameter may be those publically known, and mercury porosimetry can be employed, for example.

When such a DPF 17 increases in temperature in order to regenerate, PM captured in the vicinity of an attained portion that has attained a PM combustion initiation temperature starts to combust; however, since the PM captured in the micropores is scarce, the pressure loss in the attained portion gradually decreases, and the difference with the pressure loss at other portions is maintained small. As a result, exhaust gas is adequately supplied not only to the attained portion, but also to other portions, and since the combustion of PM progresses over the entirety of the DPF 17, PM that has deposited is presumed to be removed quickly.

In this way, according to the exhaust gas cleaner 10, since substantially the entirety of the DPF 17 is covered by the microporous body 18, the regeneration efficiency of the DPF 17 can be improved. Herein, the pore diameter of micropores of the DPF 17 may be made an appropriate setting according to the particle diameter and composition of the PM, and the heating temperature of the DPF, and the like so that the pressure loss decrease is equalized during regeneration of the DPF 17 and PM is removed at a desired rate. In view of being able to sufficiently suppress penetration of PM into the micropores, at least 95% of the micropores in the DPF 17 preferably have a pore diameter less than 7 μm (measured value by mercury porosimetry).

In addition, in view of being able to further suppress a rise in pressure loss in the beginning of the exhaust gas purification process, the microporous body 18 preferably has a porosity that is larger than the DPF 17, and the porosity of the microporous body 18 preferably is at least 45%, and more preferably at least 55%. The measurement procedure and conditions for porosity may be those publically known; however, mercury porosimetry can be employed, for example.

Microporous Body

The microporous body 18 includes a carrier and a catalyst supported on this carrier.

Carrier

The carrier is composed of an oxide with an oxygen storage/release property containing at least one element selected from the group consisting of alkali earth metal elements, transition metal elements, periodic group 12 elements, and periodic group 13 elements. These oxides have an oxygen storage/release capability, and can aid in lowering of the PM combustion initiation temperature by way of a catalyst. In addition, since oxides containing the above-mentioned elements excel in heat resistance, the capability to aid does not easily decrease greatly with time, even under high temperature conditions such as of the regeneration process. It should be noted that the oxygen storage/release property of the oxide is based on a characteristic in that the valence ordinarily can increase and decrease along with the storage and release of oxygen.

As the alkali earth metal element, Mg, Ca, Sr, Ba, and the like are preferable, and Sr and Ba are more preferable. As the transition metal element, rare-earth metal elements such as La, Ce, Pr, Nd, Pm, Sm, Eu, Gd, Tb, Dy, Ho, Er, Tm, Yb, and Lu, and noble metal elements such as Ru, Rh, Pd, Ag, Ir, Pt, and Au, as well as Mn, Fe, Co, Ni, V, Cu, Mo, W, and the like can be exemplified. Among these, La, Ce, Ru, Pd, Pt, Rh, and Mn are preferred.

Such oxides have little structural change at high temperatures such as in the regeneration process, and containing a composite oxide is preferred in view of being able to maintain the microporous structure over a long time. In addition, the composite oxide is preferably at least one selected from the group consisting of fluorite, perovskite-type, spinel-type, rutile-type, delafossite-type, magnetoplumbite-type, and ilmenite-type in view of being able to maintain the microporous structure over a longer time.

Catalyst

The catalyst contains Ag. Such a catalyst can dramatically improve fuel consumption by greatly reducing the PM combustion initiation temperature. Moreover, this temperature reduction performance does not easily decrease greatly with time, even under high temperature conditions such as of the regeneration process. It should be noted that silver oxide ($Ag_2O$) and the like can be exemplified as a specific compound constituting the catalyst.

The catalyst preferably further contains at least one type of transition metal element (other than Ag) in view of being able to improve adaptability to various conditions. Such a transition metal element is preferably a noble metal element, and is more preferably at least one selected from Ru, Pd, and Pt. In addition, the content of a compound of a transition metal is preferably at least 0.1% by mass to no more than 0.3% by mass relative to the total mass of catalyst, and more preferably at least 0.5% by mass to no more than 2% by mass.

It should be noted that, if the thickness of the microporous body 18 is too small, it will be difficult to form the microporous body 18 without unevenness (particularly in a case of using the dip-coating method), whereas if too large, a rise in pressure loss at the beginning of the exhaust gas purification process will be large, and thus is preferably at least 0.1 μm and no more than 50 μm.

The microporous body 18 is obtained by a publically known method; however, it is preferably obtained by sintering particles granulated using any of a spray-dry method, freeze-drying method, or spray-pyrolysis method. Consequently, since particles having a narrow grain size distribution are produced, a microporous body in which at least 95% of the micropores have a pore diameter less than 7 μm (measured value by mercury porosimetry) and having a porosity of at least 45% can be easily produced.

According to the exhaust gas cleaner 10 provided with such a microporous body 18, since the combustion initiation temperature of PM (soot in particular) is greatly decreased, the DPF is made to spontaneously regenerate with exhaust gas (normally 200° C. to 450° C.) passing therethrough. Consequently, since the extent or frequency of the forced DPF regeneration process achieves lowering in accordance with the fuel injected into the exhaust system, synergistic effects are obtained in that both the fuel consumption and durability can be further improved.

Production Method

The above-mentioned exhaust gas cleaner 10 may be produced by appropriately combining publically known methods; however, preferred conditions of a production method of the exhaust gas cleaner 10 are explained next. First, the DPF 17 is placed into the casing 12 so that the cells 16 thereof follow the flow direction of the gas. Next, a carrier gas in which particles granulated using a spray-dry method, freeze-drying method, spray-pyrolysis method, or the like are dispersed is flowed into the gas channel 14. At this time, particles deposited on the inlet surface 171 are sintered by heating the DPF 17 to a high temperature, and thus substantially an entirety of the inlet surface 171 is covered by a microporous body. By providing the exhaust gas cleaner 10 produced in such a way in the exhaust pipe of any internal combustion engine, it can be employed in the purification of exhaust gas from the internal combustion engine. It should be noted that, as long as the microporous body can be arranged on the inlet surface 171, this procedure is not limited to a spray-dry method, freeze-drying method, or spray-pyrolysis method.

For example, in the case of employing the spray-dry method, a solution or slurry containing the elements to configure the microporous body 18 (i.e. Ag along with at least one element selected from the group consisting of alkali earth metal elements, transition metal elements, periodic group 12 elements, and periodic group 13 elements) may be atomized and carried in a carrier gas, and then sprayed onto the DPF 17, which has been raised in temperature. Herewith, the solution or slurry thus sprayed onto the DPF 17 is instantly dried, and thus microscopic particles having a narrow grain size distribution are granulated. When these particles deposit on the inlet surface 171 and are sintered, the microporous body 18 including a carrier having oxygen release capability and a silver catalyst supported on this carrier is formed.

It should be noted that, compounds that are soluble in water such as silver nitrate ($AgNO_3$), silver chlorate ($AgClO_3$), silver perchlorate ($AgClO_4$), silver acetate ($Ag(CH_3COO)$), and silver 4-cyclohexylbutyrate ($C_6H_{11}(CH_2)_3COOAg$) can be exemplified as the Ag-base starting material contained in the slurry, and silver nitrate is preferred. In addition, a solution dissolving silver oxide ($Ag_2O$), silver powder, silver sulfate ($Ag_2SO_4$) and the like in a strong acid such as sulfuric acid or nitric acid may be used as the silver compound.

According to such a method, the carrier gas preferentially flows to low pressure portions of the DPF 17, and particles are deposited; therefore, the pressure distribution inside the DPF 17 is narrow. Consequently, combustion and removal of PM can be further expedited since the pressure distribution inside the DPF 17 is also narrow during regeneration.

In addition, the gas inside the gas channel 14 stagnates, and thus it is preferred that the gas inside the gas channel 14 is aspirated to the outlet in view of being able to avoid a situation where controlling the covering of the DPF 17 by the microporous 18 becomes difficult.

EXAMPLES

Reference Example

A solution dissolving aluminum nitrate nonahydrate in purified water was atomized with a nebulizer (manufactured by Omron Corp.). This mist was carried in a gas, and maintained at 1050° C. by a ceramic heater, then flowed into an end surface of a sealed SiC-type DPF (34 mm sides, 40 mm length) of honeycomb structure and wall-flow type (41.7% porosity, 11.2 μm average pore diameter, 300 cells, 12 mil). Herein, in order to prevent the gas from stagnating inside the DPF, a pump was operated, and the gas was aspirated from the other end side of the DPF and emitted to outside. An exhaust gas cleaner was produced by measuring the mass of the DPF while allowing the gas to flow therethrough until the deposited amount of alumina became 1.85 g.

Example 1

After mixing, 98 parts by mass of cerium nitrate and 2 parts by mass of silver nitrate were dissolved in purified water. The solution thus obtained was atomized with a nebulizer (manufactured by Omron Corp.). An exhaust gas cleaner was produced under similar condition to the Reference Example, except for the points in that the holding temperature of the SiC was set to 800° C. with a ceramic heater, and the gas was allowed to flow therethrough until the deposited amount of silver and ceria was 1.85 g.

Example 2

Into the appropriate amount of distilled water, 0.01 mol of lanthanum nitrate and 0.01 mol of manganese nitrate were dissolved. Into this solution, silver nitrate was dissolved so as to make 98 parts by mass of $LaMnO_3$ and 2 parts by mass of silver nitrate. Thereafter, an exhaust gas cleaner was produced under similar conditions to Example 1, except for the point of the gas being allowed to flow through until the deposited amount of silver and lanthanum manganite was 1.85 g.

Comparative Example 1

An exhaust gas cleaner was produced at an end surface of the untreated SiC-type DPF used in the Reference Example.

Comparative Example 2

A mixed solution was obtained by dissolving 98 parts by mass of cerium oxide and 2 parts by mass of silver nitrate in purified water. This mixed solution was evaporated to dryness with an evaporator, and after drying the solid thus obtained for 3 hours at 200° C., calcination treatment was performed thereon for 2 hours at 700° C. The powder thus generated was wet-milled with a ball mill and made a slurry, and then one end surface of the SiC-type DPF used in the Reference Example was immersed into this slurry. An exhaust gas cleaner was produced by carrying out calcination treatment for 3 hours at 700° C. on the DPF with excess slurry removed therefrom.

Evaluation

Observation

The inlet surfaces (upstream side portion of gas channel) of the filters in the exhaust gas cleaners produced for the Reference Example and the Comparative Example 2 were observed with an electron microscope. The results thereof are shown in FIG. 6.

Figure 6A:
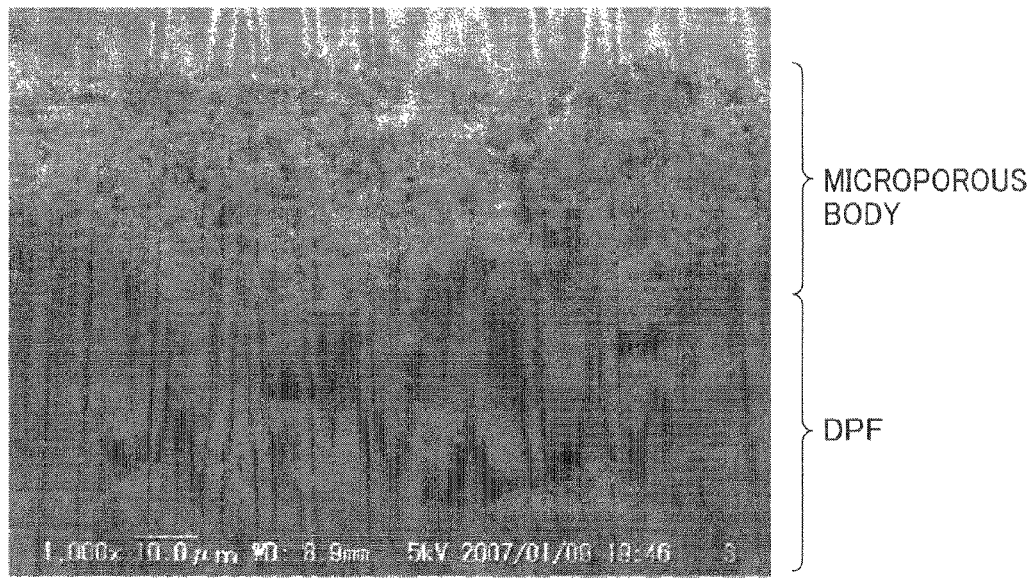
FIG. 6 is an electron microscopy image showing an inlet surface of the particulate filter configuring the exhaust gas cleaner according to a reference example.
Figure 6B:
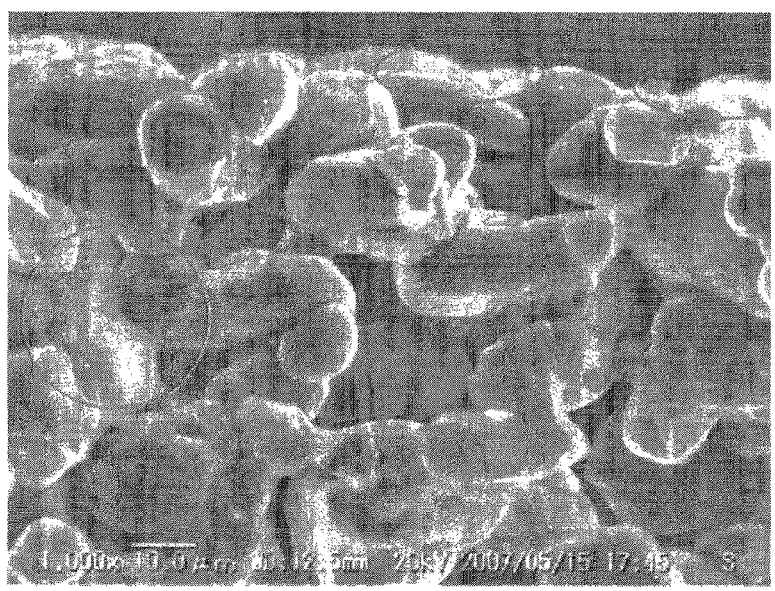

In the Reference Example, the inlet surface of the filter was uniformly covered by a microporous body composed of silver and ceria (FIG. 6(*a*)). Contrarily, in Comparative Example 2, the catalyst layer considered to be composed of silver and ceria (circled portions in FIG. 6(*b*)) was unevenly formed on the inlet surface of the filter, and portions in which pores of the filter were blocked by the catalyst layer were also present. Consequently, it was confirmed that the inlet surface of the filter could be uniformly covered by a microporous body by using the spray-dry method. It should be noted that the inlet surface of the filter in the exhaust gas cleaner produced for Examples 1 and 2 had a similar structure to the Reference Example (not illustrated).

Pore Diameter and Porosity

The pore size distribution for each microporous body in the exhaust gas cleaner produced for the Reference Example and the DPF in the exhaust gas cleaner produced for Comparative Example 2 were analyzed at conditions of 140° contact angle of mercury and surface tension of 480 dyne cm$^{-1}$. The results thereof are shown in FIG. 7.

Figure 7:
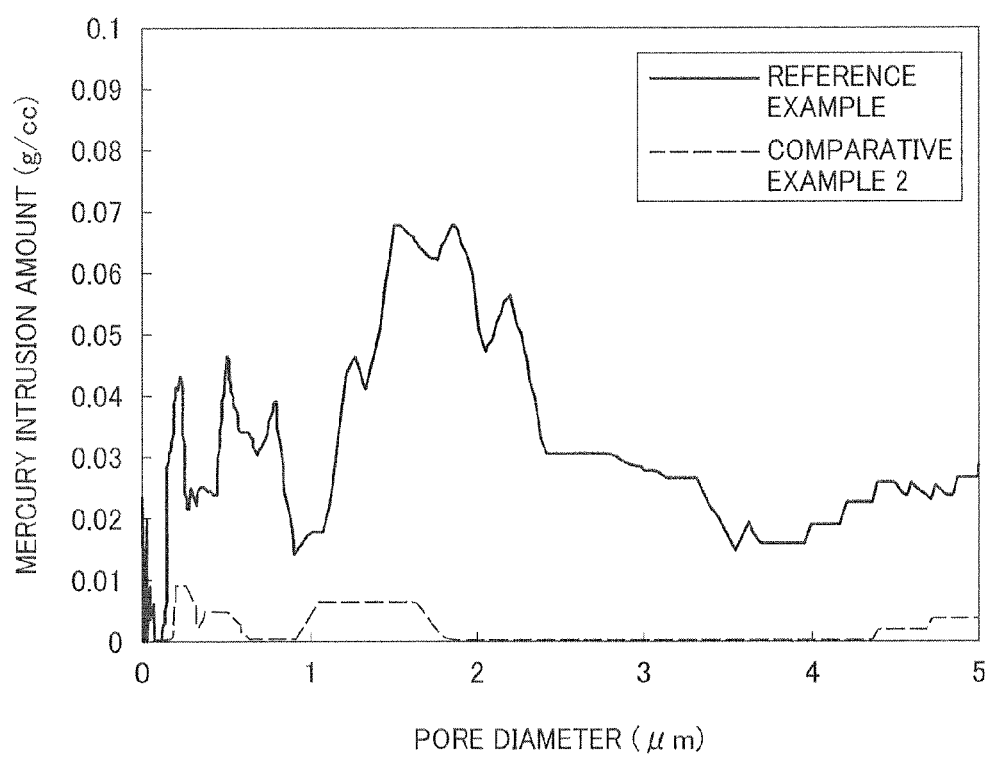
FIG. 7 is a view showing a pore size distribution of a macroporous body configuring the exhaust gas cleaner according to the reference example.

As shown in FIG. 7, pores having a pore diameter of less than 5 μm were present in abundance in the Reference Example. Contrarily, in Comparative Example 2, pores having a pore diameter of less than 5 μm were almost unconfirmed. For the Reference Example, the porosity was also measured, and was 76.7%. Although not shown in FIG. 7, the pores having a pore diameter of less than 7 μm were almost unconfirmed for Comparative Example 1 as well. It should be noted that the microporous body in the exhaust gas cleaner produced for Examples 1 and 2 also had pore size distributions and porosities similar to the Reference Example (not illustrated).

Filter Regeneration

Pre-Treatment

The exhaust gas cleaners produced for the Reference Example, Examples and Comparative Examples were installed in the exhaust pipe of a steady-state diesel engine (revolution speed: 2500 rpm, torque: 110 N·m), and exhaust was allowed to flow therethrough until the PM deposition amount became 0.09 g (4 g/L).

Regeneration Test 1

Figure 8:
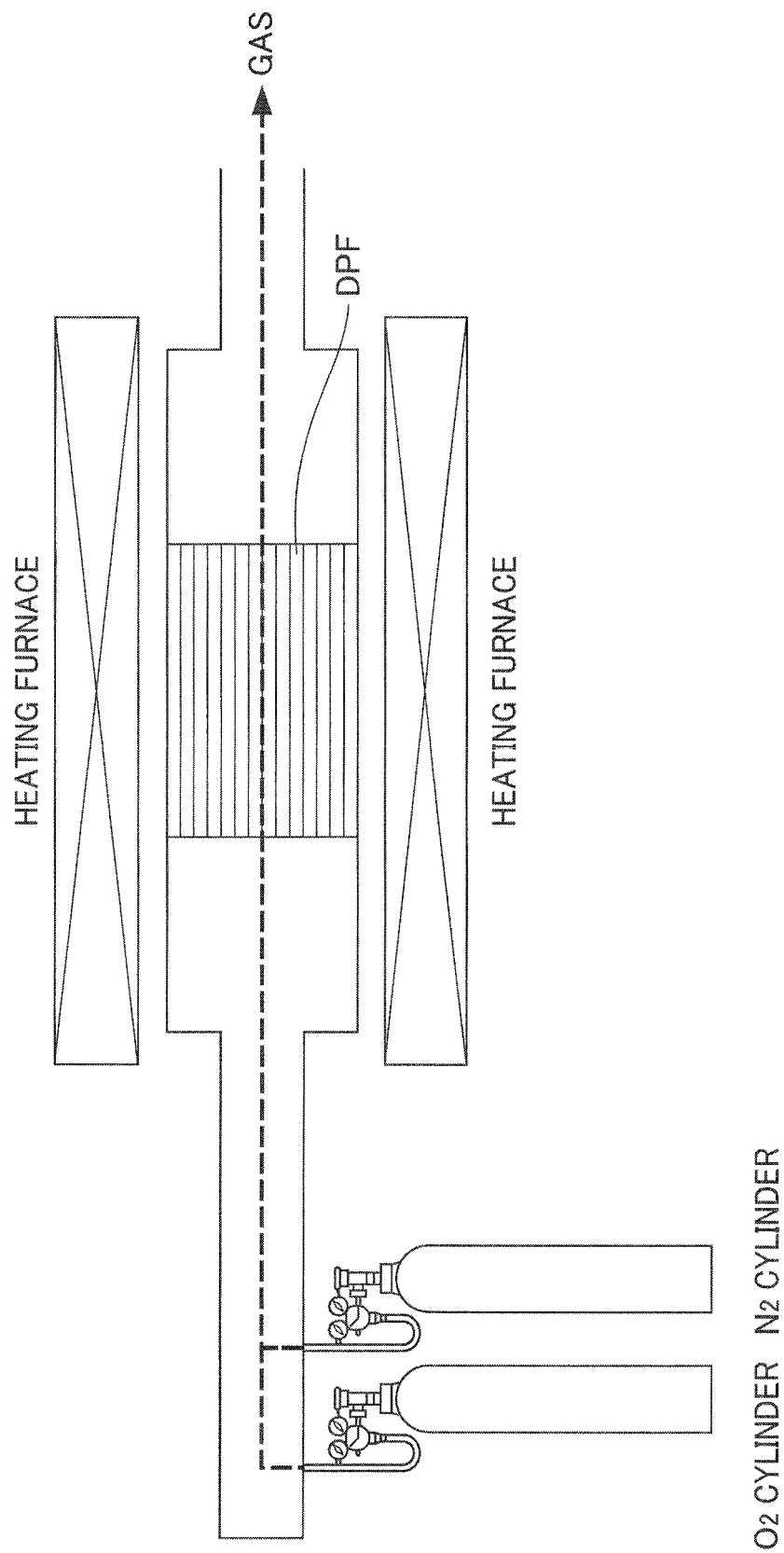
FIG. 8 is a schematic view of test equipment used in evaluation of the exhaust gas cleaner according to Examples of the present invention.

FIG. 8 is a schematic diagram of the test apparatus used in the regeneration test. First, upon detaching the exhaust gas cleaner from the above-mentioned exhaust pipe, a ventilation device was attached to the exhaust gas cleaner. Then, the filter of the exhaust gas cleaner was maintained at 600° C. (combustion initiation temperature of PM for normal conditions) under a nitrogen atmosphere in a heating furnace, after which mixed gas of 15% oxygen and 85% nitrogen was allowed to flow through the filter (flow rate: 12.8 L/min). The concentrations of CO and $CO_2$ in the gas emitted from the exhaust gas cleaner were measured using an "MWXA-7500D" measurement device (manufactured by Horiba, Ltd.), and the proportion of PM remaining in the filter was measured over time based on the following formula.

*PM* residual ratio={0.09−(CO derived integrated value×12/28)+($CO_2$ derived integrated value×12/44)}/0.09×100

Figure 9:
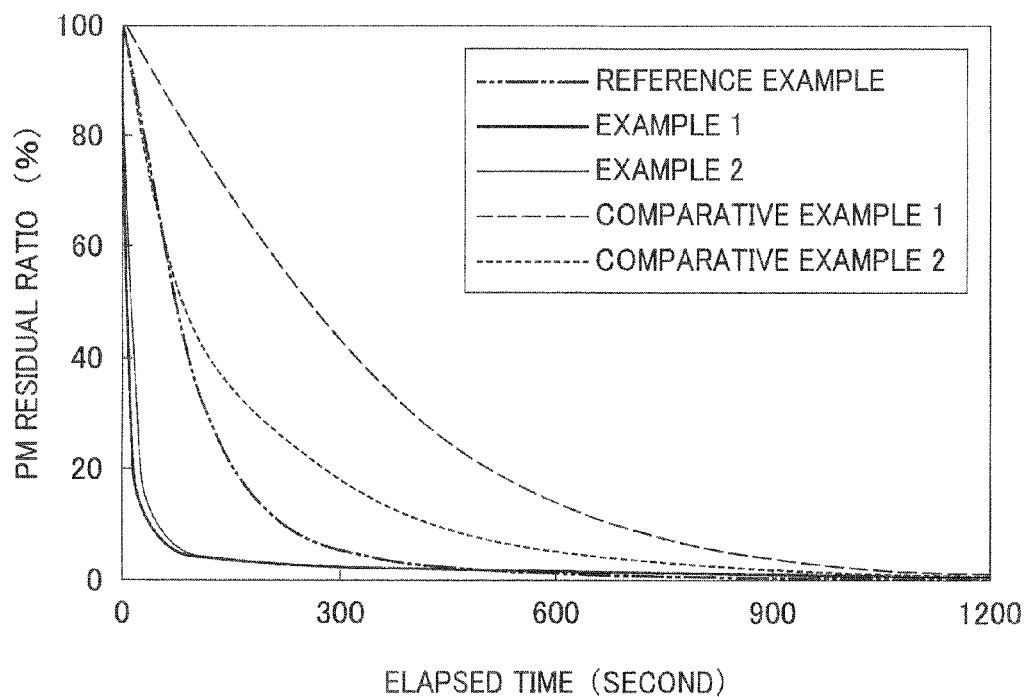
FIG. 9 is a view showing regeneration efficiency of the exhaust gas cleaner according to the Examples of the present invention.

The results thereof are shown in FIG. 9. It should be noted that the horizontal axis of the graph of FIG. 9 indicates the elapsed time after starting the flow of oxygen gas.

As shown in FIG. 9, for Examples 1 and 2, the PM residual proportion suddenly dropped from after the flow-start value, and the DPF was sufficiently regenerated after approximately 30 seconds from the start. Contrarily, the PM residual proportion for the Reference Example required approximately 200 seconds to fall below 10%, required approximately 700 seconds for Comparative Example 1, and required approximately 400 seconds for Comparative Example 2 also.

Consequently, it was understood that regeneration efficiency of the filter can be greatly improved by covering the inlet surface of the filter with a microporous body composed of a carrier having oxygen storage/release ability such as ceria or lanthanum manganite, and a silver catalyst.

Regeneration Test 2

The PM amount remaining in the filter was measured over time under conditions similar to those described above, except for the points of the filter of the exhaust gas cleaner being maintained at 500° C., and not 600° C. The results thereof are shown in FIG. 10. It should be noted that the horizontal axis of the graph of FIG. 10 indicates the elapsed time after starting the flow of oxygen gas.

As shown in FIG. 10, for Examples 1 and 2, the PM residual proportion fell below 10% after approximately 750 seconds from the flow-start, and the DPF was sufficiently regenerated. Contrarily, progression of PM removal was slow for the Reference Example, with the PM residual proportion requiring approximately 1300 seconds to fall below 10%, and approximately 35% of the PM still remained even after 2500 seconds from the start. In addition, for Comparative Example 2, although removal of PM became to some extent quick up until approximate 500 second after the start due to the catalytic functions of silver and ceria, since it slowed down thereafter, approximately 20% of the PM still remained even after 2500 seconds from the start.

Consequently, it was understood that the regeneration efficiency of the filter can be improved dramatically even under conditions of lower temperature than the combustion initiation temperature of PM for normal conditions, by covering the inlet surface of the filter with a microporous body composed of a carrier having oxygen storage/release ability such as ceria or lanthanum manganite, and a silver catalyst.

Regeneration Test 3

The PM amount remaining in the filter was measured over time under conditions similar to those described above, except for the points of the filter of the exhaust gas cleaner produced for Example 1, and Comparative Examples 1 and 2 being maintained at 450° C., and not 600° C. The results thereof are shown in FIG. 11. It should be noted that the horizontal axis of the graph of FIG. 11 indicates the elapsed time after starting the flow of oxygen gas.

As shown in FIG. 11, for Example 1, the PM residual proportion rapidly fell from the flow-start value of oxygen gas, and the PM residual proportion fell below 10% after approximately 2500 seconds. Contrarily, for Comparative Examples 1 and 2, the PM residual proportion almost did not decrease even though oxygen gas flowed therethrough, and at least approximately 65% of the PM still remained even after 2500 seconds from the start.

Based on the temperature such as 450° C. employed in the present regeneration tests being the normal exhaust gas temperature, according to the exhaust gas cleaner of Example 1, it has been shown that the filter can be sufficiently regenerated even without performing a temperature raising process such as periodically injecting and combusting fuel in the exhaust system. Consequently, a dramatic improvement in fuel consumption can be expected.

Modified Example

The present invention is not limited to the embodiment, and modifications, improvements and the like within the scope that can achieve the object of the present invention are included in the present invention.

For example, although a wall-flow type structure was employed in the embodiment, a structure in which both end surfaces are alternately sealed in a three-dimensional mesh structure or honeycomb structure, a structure in which a plurality of fibrous materials are laminated and then molded into a felt shape, or the like may be employed.

In addition, although a diesel engine is employed as the internal combustion engine in the embodiment, it may be a gasoline engine.

The invention claimed is:

1. An exhaust gas cleaner that purifies exhaust gas emitted from an internal combustion engine, the exhaust gas cleaner comprising:
    a gas channel in which exhaust gas flows; and
    a particulate filter that is provided in the gas channel and in which a plurality of pores are formed,
    wherein an inlet surface of the particulate filter, which the exhaust gas contacts, is covered over a substantial entirety thereof with a microporous body formed by micropores having a pore diameter smaller than the pores, wherein the microporous body has a porosity that is higher than the particulate filter and is at least 45%, at least 95% of the micropores of the microporous body have a pore diameter value measured by mercury porosimetry of less than 7 µm, and the thickness of the microporous body is at least 0.1 µm and no more than 50 µm, and
    wherein the microporous body includes a carrier composed of an oxide with an oxygen storage/release property containing at least one element selected from the group consisting of alkali earth metal elements, transition metal elements, periodic group 12 elements, and periodic group 13 elements, and a catalyst containing Ag and at least one transition metal element selected from the group consisting of Ru, Pd, and Pt, where the catalyst is supported on the carrier.

2. The exhaust gas cleaner according to claim 1 wherein the oxide includes a composite oxide.

3. The exhaust gas cleaner according to claim 2, wherein the composite oxide is at least one type selected from the group consisting of fluorite, perovskite-type, spinel-type, rutile-type, delafossite-type, magnetoplumbite-type, and ilmenite-type.

* * * * *